United States Patent Office 3,706,733
Patented Dec. 19, 1972

3,706,733
EPITHIO-THIOL-DIENOATES
Clive A. Henrick, 1621 Channing Ave., and John B. Siddall, 2470 Greer St., both of Palo Alto, Calif. 94304
No Drawing. Filed Feb. 16, 1971, Ser. No. 115,725
Int. Cl. C07d 59/00, 1/00
U.S. Cl. 260—327 E
9 Claims

ABSTRACT OF THE DISCLOSURE

Polyunsaturated aliphatic hydrocarbon thiolesters, nitriles, amines, halides, alcohols and derivatives thereof, synthesis thereof, for the control of arthropods.

---

This invention relates to novel polyunsaturated aliphatic compounds, novel intermediates therefor, syntheses thereof and to the control of arthropods. The novel polyunsaturated aliphatic compounds are represented by the following Formula A:

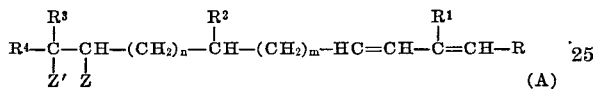

(A)

wherein, $m$ is zero or the positive integer one, two or three;
$n$ is the positive integer one, two or three;
Z is hydrogen, bromo, chloro, fluoro or hydroxy;
Z' is bromo, chloro, fluoro, —OR$^6$, or, taken together with Z, oxido, epithio, imino or carbon-carbon bond;
R$^1$ is hydrogen or alkyl;
each of R$^2$, R$^3$ and R$^4$ is alkyl;
R$^5$ is one of the groups

—C≡N, —CH$_2$—X, —CH$_2$—OR$^7$, —CH$_2$—SR$^7$

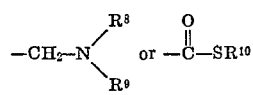

R$^6$ is hydrogen, carboxylic acyl, alkyl, cycloalkyl, aralkyl or aryl; R$^7$ is hydrogen, alkyl, cycloalkyl, aralkyl or aryl; X is bromo or chloro;
each of R$^8$ and R$^9$ is hydrogen, alkyl, alkenyl, cycloalkyl, hydroxyalkyl, alkoxyalkyl, phenyl, or, when taken together with the nitrogen atom to which they are attached, pyrrolidino, morpholino, piperidino, piperazino or 4-alkylpiperazino; and R$^{10}$ is alkyl.

The compounds of Formula A are useful for the control of arthropods, particularly insects. The compounds are applied using suitable carrier substances, such as either liquid or solid carriers, such as water, acetone, cottonseed oil, xylene, mineral oil, silica, talc, natural and synthetic resins, and the like. Generally, compositions for application will contain up to about 75% of the active compound and more usually less than 25%, sufficient composition should be applied to provide from about 0.1 to 25 micrograms of the active compound per insect. Typical insects controlled by the present invention are Diptera, such as mosquitos and houseflies; Hemiptera, such as Pyrrhocoridae and Miridae; Lepidoptera, such as Pyralidae, Noctuidae and Gelechiidae; and Coleoptera, such as Tenebrionidae, Chrysomelidae and Dermestidae. For example, *Pyrrhocoris apterus*, *Lygus hesperus*, Aphids, *Tenebrio molitor*, *Triboleum*, *confusm*, *Diabrotica duodecimpunctata*, *Dermestes maculatus*, Alfalfa weevill, Potatoe tubermoth, *Aedes aegypti* and *Musca domestica*. Without any intention of being bound by theory, the compounds of Formula A are believed to be effective by reason of hormonal action in that unlike conventional insecticides which are effective by reason of causing immediate death, the compounds of Formula A are effective by reason of physiological changes caused in the treated insect which result in eventual death of the insect and/or inability of the treated insect to reproduce by reason of sterility or abnormal development.

In the description hereinafter, each of R$^1$ through R$^{10}$, X, Z, Z', $m$ and $n$ is as defined hereinabove.

The compounds of the present invention are prepared according to the following outlined syntheses:

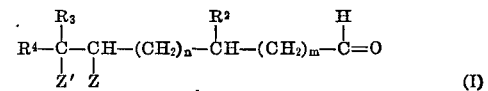

(I)

↓

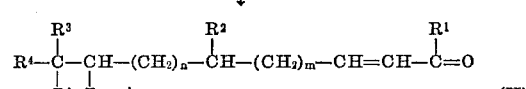

(II)

(A; R$^5$ is —C≡N) ↓

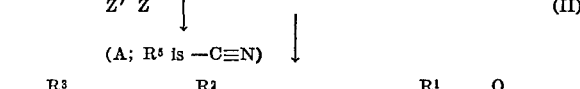

(III)

↓

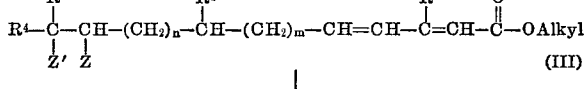

(A; R$^5$ is —CH$_2$—OH)

In the above outlined process, an aldehyde of Formula I is reacted with a carbanion of Formula IA or by Wittig reaction using an ylid of Formula IB to produce a compound of Formula II (R is cycloalkyl or phenyl).

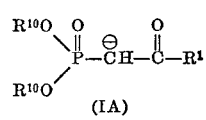 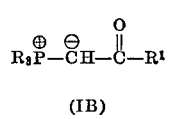

(IA) (IB)

A compound of Formula II is reacted with a dialkyl phosphonoacetonitrile in the presence of base, such as an alkali metal hydride or alkali metal alkoxide, in an organic solvent, such as a hydrocarbon, ether or dialkylsulfoxide, e.g. tetrahydrofuran, benzene, dimethylsulfoxide, toluene, dimethylformamide, and the like, to prepare the novel nitriles of Formula A.

The esters of Formula III are prepared by the reaction of a compound of Formula II with carbanion of dialkyl carbalkoxymethylphosphonate as described in our copending application Ser. No. 111,766, filed Feb. 1, 1971, now abandoned, the disclosure of which is incorporated by reference. Reduction of an ester of Formula III using a lithium aluminum hydride, or the like, affords the allylic alcohols of Formula A ($R^5$ is —$CH_2$—$OR^7$ in which $R^7$ is hydrogen).

Ethers of the alcohols are prepared by etherification of the alcohol of Formula A or by first converting the alcohol into the corresponding bromide or chloride ($R^5$ is —$CH_2$—X) and then reacting the halide with the salt of an alcohol according to the ether moiety desired. The halides also serve as precursors for the preparation of the novel thiols, thioethers and amines of the present invention. Thus, reaction of a halide of formula A with thiourea or hydrogen sulfide yields the novel thiols. The thioethers of the present invention are then prepared from a halide of Formula A by reaction with a mercaptan or from the thiol. The amines of Formula A are prepared by reaction of halide of Formula A with the desired amine.

The thiolesters of Formula A

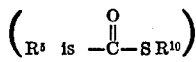

are prepared from the acid chloride by reaction with alkylmercaptan or alkyl lead mercaptide.

The novel epoxides of Formula A (Z' taken together with Z is oxido) are prepared by reacting a tri-unsaturated compound of Formula A (Z' taken together with Z is a carbon-carbon bond) with an organic peracid, such as perphthalic acid or perbenzoic acid, in an organic solvent. The epoxides serve as precursors for producing the episulfides (A; Z' taken together with Z is epithio) by reaction with potassium thiocyanate or ammonium thiocyanate in an organic solvent, such as a lower alcohol.

The novel mono-halo compounds of Formula A (Z' is bromo, chloro or fluoro and Z is hydrogen) are prepared by treating a tri-unsaturated compound of Formula A with one equivalent of dry hydrogen halide in a halogenated hydrocarbon solvent of low dielectric constant. The dihalo compounds of Formula A (each of Z' and Z is bromo, chloro or fluoro) are produced by treating a triene of Formula A with one equivalent of dry bromine, chlorine or fluorine in a halogenated hydrocarbon solvent.

The mono-hydroxy compounds of Formula A (Z' is hydroxy, Z is hydrogen) are produced by the addition of water to the terminal olefinic bond using a mercuric salt followed by reduction of the oxy-mercurial intermediate in situ. Suitable mercuric salts include mercuric acetate, mercuric nitrate, mercuric trifluoroacetate, mercuric acylates and mercuric halides. Suitable reducing agents include the borohydrides, hydrazine and sodium amalgam. See Brown and Rei, J. Am. Chem. Soc. 91, 5646 (1969); Brown et al;, J. Am. Chem. Soc. 89, 1522 and 1524 (1967); and Wakabayashi, J. Med. Chem. 12, 191 (January 1969). By conducting the reaction in the presence of an alcohol

such as methanol, ethanol, isopropyl alcohol, benzyl alcohol, cyclopentanol, and the like, the corresponding ether is prepared. The compounds of Formula A, wherein $R^6$ is carboxylic acyl, are prepared from a compound of Formula A, wherein $R^6$ is hydrogen, by reaction with a carboxylic acid chloride or bromide or carboxylic acid anhydride in pyridine or by treatment with a carboxylic acid anhydride in the presence of sodium acetate. The reaction is generally conducted at about room temperature to reflux temperature for about one to forty-eight hours, shorter reaction time being favored by temperatures above room temperature.

The novel aziridines of Formula A (Z' taken together with Z is imino) are prepared as follows:

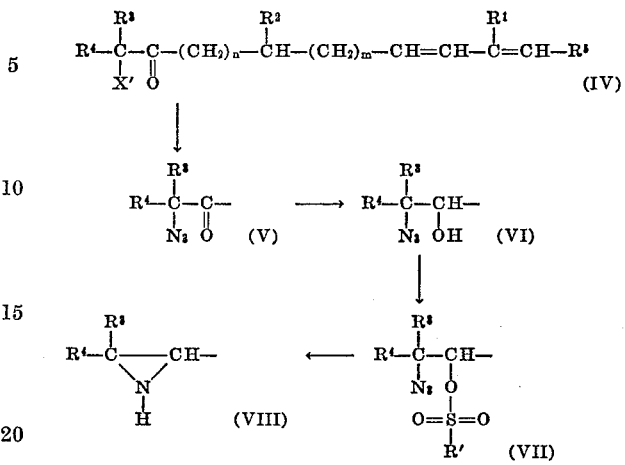

In the above formulas X' is bromo or chloro and R' is methyl or tolyl.

In the practice of the above process, a haloketone of Formula IV is reacted with an alkali azide, such as sodium azide, in an organic solvent, such as dimethylformamide, dimethylacetamide, and the like, at room temperature or above to afford the 11-azido compound (V). The azidoketone (V) is then reduced using sodium borohydride or other reducing agent to yield the corresponding 10-hydroxy-11-azido of Formula VI. A compound of Formula VI is treated with tosyl or mesylchloride in triethylamine, pyridine, or the like, to form the sulfone (VII). A compound of Formula VII is then reduced using a reducing agent formed of sodium borohydride and a transition metal, such as a lower valence cobaltous halide. The reducing agent can be formed in the presence or absence of dipyridyl. The reduction and formation of the reducing agent can be carried out in an organic solvent, such as ethanol, methanol, tetrahydrofuran, and other high boiling ethers.

The haloketones (IV) are prepared from the corresponding halohydrin (A; Z' is bromo or chloro and Z is hydroxy) by oxidation using Jones reagent or chromium trioxide/pyridine. The halohydrin is prepared by treatment of an epoxide of Formula A with HCl or HBr in the presence of water which affords 11-hydroxy-10-halo, as well, which can be separated by chromatography.

Another embodiment of the present invention is the aziridines of the alkyl ester (III) which can be prepared by the aforementioned procedure. These compounds are used for the control of insects in the same way as the compounds of Formula A.

As alternative syntheses embraced in the outlined syntheses above, a mono-saturated aldehyde of Formula I (Z' taken together with Z is a carbon-carbon bond) can first be elaborated using the methods described above and thereafter converted into the carbonyl of Formula II which is then converted into the compounds of Formula A.

The term "carboxylic acyl," as used herein, refers to the acyl group of carboxylic acid, anhydride or halide. The acyl group is determined by the particular carboxylic acid halide or carboxylic acid anhydride employed in the esterification of a compound of Formula A wherein $R^6$ is hydrogen. Although no upper limitation need be placed on the number of carbon atoms contained in the acyl group within the scope of the present invention, generally it contains from one to eighteen carbon atoms. Typical esters of the present invention include formate, acetate, propionate, enanthate, benzoate, trimethylacetate, trichloroacetate, trifluoroacetate, t-buylacetate, phenoxyacetate, cyclopentylpropionate, aminoacetate, β-chloropropionate, adamantoate, octadec-9-enoate, dichloroacetate, butyrate, pentanoate, hexanoate, phenylacetate, p-methylbenzoate, β-phenylpropionate, 3,4-dimethylbenzoate, p-isopropylbenzoate, cyclohexylacetate, stearate, methacrylate, p-chloromethylbenzoate, p-methoxybenzoate and p-nitrobenzoate.

The term "cycloalkyl," as used herein, refers to a cyclic alkyl group of four to eight carbon atoms. The term "aralkyl" refers to a monovalent group in which an aryl group is substituted for a hydrogen atom of an alkyl group, such as benzyl, xylyl, mesityl, phenylethyl, methylbenzyl, anphthylmethyl and naphthylethyl of seven to twelve carbon atoms.

The term "alkyl," as used herein, refers to a straight or branched chain saturated aliphatic hydrocarbon group having a chain length of one to twelve carbon atoms, such as methyl, etyl, n-propyl, i-propyl, n-butyl, n-hexyl, n-amyl, n-heptyl, n-octyl, n-nonyl, lauryl, n-decyl, t-amyl, 3-ethylpentyl and 2-methylhexyl. The term "hydroxyalkyl," as used herein, refers to an alkyl group substituted with one hydroxy group, e.g. hydroxymethyl, p-hydroxyethyl and 4-hydroxypentyl. The term "alkoxyalkyl," as used herein, refers to an alkyl group substituted with one alkoxy group, e.g. methoxymethyl, 2-methoxyethyl, 4-ethoxybutyl, n-propoxyethyl and t-butylethyl. The terms "alkenyl," as used herein, refers to an ethylenically unsaturated hydrocarbon group, branched or straight chain, having a chain length of two to twelve carbon atoms, e.g. allyl, vinyl, 3-butenyl, 2-butenyl, 2-hexenyl and i-propenyl. Whenever any of the foregoing terms are modified by the word "lower," the chain length of the group is not more than six carbon atoms with the exception of lower alkoxyalkyl in which event a total chain length of twelve carbon atoms is the maximum.

The term "aryl," as used herein, refers to a monovalent aryl group of six to twelve carbon atoms, such as phenyl, naphthyl, methylphenyl, p-ethylphenyl, dimethylphenyl, isopropylphenyl, t-butylphenyl, and the like.

The following examples are provided to illustrate the present invention. Temperature is given in degrees centigrade.

EXAMPLE 1

To 126 mg. of a 57% dispersion of sodium hydride in oil is added pentane. The pentane is removed and the sodium hydride washed several times with pentane. To the washed sodium hydride is added 582 mg. of diethyl acetylmethylphosphonate (IA; $R^{10}$ is ethyl, $R^1$ is methyl) in 5 ml. of tetrahydrofuran at −10° under argon. After several minutes, the solution is transferred to a solution of 425 mg. of 3,7-dimethyloct-6-en-1-al in about 4 ml. of dry tetrahydrofuran under argon over a period of about 20 minutes at room temperature. After about two hours, water is added followed by addition of ether and the layers separated. The organic layer is washed with saturated sodium chloride, dried over sodium sulfate and evaporated under reduced pressure to yield 6,10-dimethylundeca-3,9-dien-2-one.

EXAMPLE 2

One gram of triphenylphosphinacetylmethylene and 425 mg. of 3,7-dimethylnon-6-en-1-al are dissolved in 10 ml. toluene and refluxed under nitrogen overnight. The toluene is distilled off and the formed triphenylphosphine oxide crystallized by addition of pentane. Filtration and evaporation of the pentane gives a residue, which is further purified by preparative thin-layer chromatography to yield 6,10-dimethyldodeca-3,9-dien-2-one.

EXAMPLE 3

41 grams of 3,7-dimethyloct-6-en-1-al and 80 g. of recrystallized (ethyl acetate) triphenylphosphineacetylmethylene [Ramirez et al., J. Org. Chem. 22, 41 (1957)] are refluxed in one liter of dry toluene for 18 hours, under nitrogen. Most of the solvent is removed in vacuo, 500 ml. pentane is added and the mixture filtered. The flask and the triphenylphosphine oxide filter cake are washed several times with pentane. The filtrate is concentrated under vacuum to yield 6,10-dimethylundeca-3,9-dien-2-one.

EXAMPLE 4

Using the process of either of Example 1, 2 or 3, each of the aldehydes under column I is converted into the respective di-unsaturated ketone under column II.

(I)

3,7-dimethylnon-6-en-1-al
3-methyl-7-ethylnon-6-en-1-al
3,7-diethylnon-6-en-1-al
4,8-dimethylnon-7-en-1-al
3,6-dimethylhept-5-en-1-al
3,6-dimethyloct-5-en-1-al
2,6-dimethylhept-5-en-1-al (II)

6,10-dimethyldodeca-3,9-dien-2-one
6-methyl-10-ethyldodeca-3,9-dien-2-one
6,10-diethyldodeca-3,9-dien-2-one
7,11-dimethyldodeca-3,10-dien-2-one
6,9-dimethyldeca-3,8-dien-2-one
6,9-dimethylundeca-3,8-dien-2-one
5,9-dimethyldeca-3,8-dien-2-one

EXAMPLE 5

To sodium hydride (0.7 g.), previously washed with hexane, under nitrogen, is added 75 ml. of dry tetrahydrofuran and then, after cooling to 0°, 5.1 g. of diethyl phosphonoacetonitrile is added slowly. The mixture is stirred for about 30 minutes and then added slowly to 6.8 g. of 6,10-dimethylundeca - 3,9 - diene - 2 - one at room temperature with stirring. The mixture is stirred for about 12 hours and then poured into saturated sodium chloride at 0°. The layers are separated and the organic layer dried over magnesium sulfate and evaporated to yield cis/trans 3,7,11-trimethyldodeca-2,4,10-trienenitrile.

The above process is repeated using each of the ketones of column II as the starting material to yield the respective nitrile under column III.

(III)

3,7,11-trimethyltrideca-2,4,10-trienenitrile
3,11-dimethyl-7-ethyltrideca-2,4,10-trienenitrile
3-methyl-7,11-diethyltrideca-2,4,10-trienenitrile
3,8,12-trimethyltrideca-2,4,11-trienenitrile
3,7,10-trimethylundeca-3,4,9-trienenitrile
3,7,10-trimethyldodeca-2,4,9-trienenitrile
3,6,10-trimethylundeca-2,4,9-trienenitrile

EXAMPLE 6

To a solution of 2 g. of methyl 3,7,11-trimethyldodeca-2,4,10-trienoate and 20 ml. of dry ether, at −78°, is added slowly about 0.4 g. of lithium aluminum hydride in dry ether. The mixture is allowed to stand about one hour after addition is complete and then allowed to warm up to room temperature. Then 2.5 ml. of acetic acid is added. The mixture is then washed with ice water and the organic phase separated which is dried over magnesium sulfate and evaporated to yield 3,7,11-trimethyldodeca-2,4,10-trien-1-ol.

By use of the process of this example, each of the esters under column IV is reduced to prepare the respective allylic alcohol under column V.

(IV)

methyl 3,7,11-trimethyltrideca-2,4,10-trienoate
methyl 3,11-dimethyl-7-ethyltrideca-2,4,10-trienoate
methyl 7,11-diethyl-3-methyltrideca-2,4,10-trienoate
methyl 3,8,12-trimethyltrideca-2,4,11-trienoate
methyl 3,7,10-trimethylundeca-2,4,9-trienoate
methyl 3,7,10-trimethyldodeca-2,4,9-trienoate,
methyl 3,6,10-trimethylundeca-2,4,9-trienoate,
methyl 7,11-dimethyldodeca-2,4,10-trienoate
methyl 7,11-dimethyltrideca-2,4,10-trienoate,
methyl 7-ethyl-11-methyltrideca-2,4,10-trienoate
methyl 7,11-diethyltrideca-2,4,10-trienoate,
methyl 8,12-dimethyltrideca-2,4,11-trienoate,
methyl 7,10-dimethylundeca-2,4,9-trienoate
methyl 7,10-dimethyldodeca-2,4,9-trienoate
methyl 6,10-dimethylundeca-2,4,9-trienoate (V)

3,7,11-trimethyltrideca-2,4,10-trien-1-ol
3,11-dimethyl-7-ethyltrideca-2,4,10-trien-1-ol
7,11-diethyl-3-methyltrideca-2,4,10-trien-1-ol
3,8,12-trimethyltrideca-2,4,11-trien-1-ol
3,7,10-trimethylundeca-2,4,9-trien-1-ol
3,7,10-trimethyldodeca-2,4,9-trien-1-ol
3,6,10-trimethylundeca-2,4,9-trien-1-ol
7,11-dimethyldodeca-2,4,10-trien-1-ol
7,11-trimethyltrideca-2,4,10-trien-1-ol
7-ethyl-11-methyltrideca-2,4,10-trien-1-ol
7,11-diethyltrideca-2,4,10-trien-1-ol
8,12-dimethyltrideca-2,4,11-trien-1-ol
7,10-dimethylundeca-2,4,9-trien-1-ol
7,10-dimethyldodeca-2,4,9-trien-1-ol
6,10-dimethylundeca-2,4,9-trien-1-ol

EXAMPLE 7

To a mixture of 4 g. of 3,7,11 - trimethyldodeca-2,4,10-trien-1-ol and 25 ml. of benzene at 0° is added a solution of 5 ml. of phosphorus tribromide in 18 ml. of benzene over about 15 minutes. The mixture is stirred at 0° for one hour. The mixture is then poured onto ice and extracted with pentane. The organic phase is washed with aqueous sodium bicarbonate, water and then brine, dried over magnesium sulfate and evaporated to yield 1-bromo-3,7,11-trimethyldodeca-2,4,10-triene.

The process of this example is repeated using each of the alcohols under column V to prepare the respective bromide under column VI.

(VI)

3,7,11-trimethyltrideca-2,4,10-trienyl bromide
3,11-dimethyl-7-ethyltrideca-2,4,10-trienyl bromide
7,11-diethyl-3-methyltrideca-2,4,10-trienyl bromide
3,8,12-trimethyltrideca-2,4,11-trienyl bromide
3,7,10-trimethylundeca-2,4,9-trienyl bromide
3,7,10-trimethyldodeca-2,4,9-trienyl bromide
3,6,10-trimethylundeca-2,4,9-trienyl bromide
7,11-dimethyldodeca-2,4,10-trienyl bromide
7,11-dimethyltrideca-2,4,10-trienyl bromide
7-ethyl-11-methyltrideca-2,4,10-trienyl bromide
7,11-diethyltrideca-2,4,10-trienyl bromide
8,12-dimethyltrideca-2,4,11-trienyl bromide
7,10-dimethylundeca-2,4,9-trienyl bromide
7,10-dimethyldodeca-2,4,9-trienyl bromide
6,10-dimethylundeca-2,4,9-trienyl bromide By repeating the process of this example using phosphorus trichloride in place of phosphorus tribromide, the novel allylic chlorides are prepared, i.e.—3,7,11-trimethyldodeca - 2,4,10 - trienyl chloride, 3,7,11-trimethyltrideca-2,4,10 - trienyl chloride, 3,11-dimethyl - 7 - ethyltrideca-2,4,10-trienyl chloride, etc.

EXAMPLE 8

Ten grams of 1-bromo - 3,7,11 - trimethyldodeca-2,4,10-triene is mixed with 50 ml. of benzene, cooled to 5–10° and saturated with ammonia. The resulting mixture is stirred for four hours allowing the temperature to rise to about 20° while maintaining dry conditions. The mixture is washed with dilute sodium hydroxide and then evaporated under reduced pressure to yield 3,7,11 - trimethyldodeca-2,4,10-trienylamine.

By repeating the process of this example using the allylic bromides or chlorides of Example 7, the respective amines are prepared, e.g.—3,7,11-trimethyltrideca-2,4,10-trienylamine, 3,11 - dimethyl - 7 - ethyltrideca - 2,4,10-trienylamine, etc.

EXAMPLE 9

Five grams of 1-bromo-3,7,11-trimethyldodeca-2,4,10-triene in 25 ml. of benzene is mixed with 4 g. of diethylamine and the mixture stirred for about three hours. Methylene chloride (50 ml.) is added and the mixture washed with dilute sodium hydroxide and then water and evaporated to yield N,N-diethyl 3,7,11-trimethyldodeca-2,4,10-trienylamine.

The process of this example is repeated using either the bromides or chlorides of Example 7 as the starting material to prepare the respective N,N-diethyl amine, e.g.—N,N-diethyl-3,7,11 - trimethyltrideca - 2,4,10 - trienylamine, N,N-diethyl 3,11-dimethyl - 7 - ethyltrideca - 2,4,10 - trienylamine, etc.

Other amines of the present invention of Formula A are prepared by use of the foregoing procedure using an amine of the formula

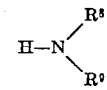

such as dimethylamine, ethylamine, methylamine, pyrrolidine, morpholine, 4-ethylpiperazine, and the like in place of diethylamine. Thus, there is prepared N,N-dimethyl 3,7,11-trimethyldodeca - 2,4,10 - trienylamine, N,N-dimethyl 3,7,11 -trimethyltrideca - 2,4,10 - trienylamine, N-ethyl 3,7,11 - trimethyldodeca - 2,4,10 - trienylamine, N-ethyl 3,7,11 - trimethyltrideca - 2,4,10 - trienylamine, etc.

EXAMPLE 10

To one g. of 3,7,11-trimethyldodeca-2,4,10-trien-1-ol in 20 ml. of dry ether is added one molar equivalent of diazoethane. One drop of boron-trifluoride is added and after 1 hour at 0° the mixture is then washed with water and organic phase evaporated to yield the ethyl ether of 3,7,11-trimethyldodeca-2,4,10-trien-1-ol.

The use of diazomethane and diazopropane in the foregoing procedure affords the methyl ether and propyl ether.

Similarly, each of the allylic alcohols of Example 6 is converted into the respective ethyl ether, methyl ether and propyl ether using the procedure of this example. For example, 1-ethoxy-3,7,11-trimethyldodeca-2,4,10-triene, 1-ethoxy - 3,7,11 - trimethyltrideca-2,4,10-triene, 1-methoxy-3,7,11 - trimethyldodeca - 2,4,10-triene, 1-methoxy-3,7,11-trimethyltrideca - 2,4,10 - triene, 1-n-propoxy-3,7,11-trimethyldodeca-2,4,10-triene, 1 - n - propoxy - 3,7,11 - trimethyltrideca - 2,4,10 - triene, etc.

EXAMPLE 11

One g. of 3,7,11 - trimethyldodeca - 2,4,10 - trien-1-ol in 10 ml. of diglyme is added dropwise to a slurry of 1 g. sodium hydride in 10 ml. of diglyme under nitrogen. To this mixture is added 0.9 g. of cyclohexylchloride. The reaction mixture is stirred at about 25° for 30 minutes and then quenched in ice water, dried over sodium sulfate and evaporated to yield the cyclohexyl ether of 3,7,11-trimethyldodeca-2,4,10-trien-1-ol.

By reacting cyclopentyl chloride, chlorobenzene, and benzyl chloride with the alcohols of Example 6 using the procedure of this example, the respective cyclopentyl ether, phenyl ether and benzyl ether are prepared.

EXAMPLE 12

To a suspension of 1 g. of sodium hydride in 10 ml. of tetrahydrofuran, under argon, and cooled to 4° is slowly added 4 g. of p-ethylphenol in 15 ml. of tetrahydrofuran. The mixture is stirred for about 8 hours. To the mixture, cooled in an ice-bath, is slowly added 4 g. of 3,7,11-trimethyldodeca-2,4,10-trienyl bromide in ether. After about 2 hours, the mixture is warmed to room temperature and allowed to stand about 12 hours. The mixture is then poured into water and extracted with ether. The ethereal extracts are combined, washed with dilute aqueous sodium hydroxide, water and brine, dried over sodium sulfate and then evaporated to yield 3,7,11-trimethyldodeca-2,4,10-trienyl p-ethylphenyl ether.

By use of the above process, the other bromides of Example 7 can be converted into the respective p-ethylphenyl ether. Similarly, using other alcohols in place of p-ethylphenol in the process of this example, the corresponding ethers are prepared.

EXAMPLE 13

A mixture of 12 g. of 1-bromo-3,7,11-trimethyldodeca-2,4,10-triene, 8 g. of thiourea and 5 ml. of water is stirred and heated under reflux for about three hours. A solution of 6 g. of sodium hydroxide in 60 ml. of water is added and the mixture refluxed with stirring for about two hours. The mixture is diluted with water and separated. The organic phase is washed with water and dried over magnesium sulfate to yield 3,7,11-trimethyldodeca-2,4,10-trienyl-mercaptan which can be purified by chromatography.

By use of the above process, other C-1 halides of Example 7 are converted into the corresponding thiol, e.g., 3,7,11 - trimethyltrideca - 2,4,10 - trienylmercaptan, 3,11 - dimethyl - 7 - ethyltrideca - 2,4,10 - trienylmercaptan, 7,11 - diethyl - 3 - methyltrideca - 2,4,10 - trienylmercaptan, etc.

EXAMPLE 14

To a solution of 2 g. of sodium in 50 ml. of methanol at 0° is added 4.5 g. of methylmercaptan. After about 0.5 hour, 20 g. of 1 - bromo-3,7,11-trimethyldodeca-2,4,10-triene is added and then the mixture refluxed for about two hours.

The solvent is evaporated and the concentrate taken up in petroleum ether which is washed with water, dried over magnesium sulfate and evaporated under reduced pressure to yield methylmercaptan 3,7,11-trimethyldodeca-2,4,10-dienyl (3,7,11 - trimethyldodeca - 2,4,10 - trienyl thiomethane).

By repeating the process of this example using other halides of Example 7 as the starting material, the respective methyl thioethers are prepared, e.g. 3,7,11-trimethyltrideca-2,4,10-trienyl thiomethane, 3,11-dimethyl-7-ethyltrideca-2,4,10-trienyl thiomethane, 7,11-diethyl-3-methyltrideca-2,4,10-trienyl thiomethane, etc.

Other thioethers of the present invention are prepared by reacting a mercaptan of the formula $R^7$—SH with an allylic halide of the present invention following the procedure of this example. Thus, the use of ethylmercaptan, benzylmercaptan, phenylmercaptan, cyclopentylmercaptan, and the like, in place of methyl mercaptan affords the respective thioether, e.g.—3,7,11-trimethyldodeca-2,4,10-trienyl thioethane, 3,7,11-trimethyltrideca-2,4,10-trienyl thioethane, 3,11-dimethyl-7-ethyltrideca - 2,4,10 - trienyl thioethane.

EXAMPLE 15

To a solution of 2 g. of sodium hydroxide in 40 ml. of methanol saturated with hydrogen sulfide is added 10 g. of 1-bromo-3,7-11-trimethyldodeca-2,4,10-triene. The mixture is stirred at about 25° for about five hours. The mixture is then diluted with water and extracted with petroleum ether. The organic phase is separated, washed well with water, dried over sodium sulfate and evaporated under reduced pressure to yield 3,7,11-trimethyldodeca-2,4,10-trienylmercaptan (3,7,11 - trimethyldodeca-2,4,10-trien-1-thiol) which can be purified by chromatography.

EXAMPLE 16

To a solution of 25.4 g. of 3,7,11-trimethyldodeca-2,4,10-trienoyl chloride in ether is added 12.4 g. of ethylmercaptan and 11.8 g. of pyridine at −40°. The mixture is allowed to stand at 0° for about 3 hours and then is diluted with ether and water and separated. The ether phase is washed with dilute aqueous sodium hydroxide, dilute hydrochloric acid and then water, dried and solvent removed to yield ethyl 3,7,11-trimethyl-thioldodeca-2,4,10-trienoate.

The process of this example is repeated using each of the acid chlorides under column VII to prepare the respective thiol ester under column VIII.

(VII)

3,7,11-trimethyltrideca-2,4,10-trienoyl chloride
3,11-dimethyl-7-ethyltrideca-2,4,10-trienoyl chloride
7,11-diethyl-3-methyltrideca-2,4,10-trienoyl chloride
3,8,12-trimethyltrideca-2,4,11-trienoyl chloride
3,7,10-trimethylundeca-2,4,9-trienoyl chloride
3,7,10-trimethyldodeca-2,4,9-trienoyl chloride
3,6,10-trimethylundeca-2,4,9-trienoyl chloride
7,11-dimethyldodeca-2,4,10-trienoyl chloride
7,11-dimethyltrideca-2,4,10-trienoyl chloride
7-ethyl-11-methyltrideca-2,4,10-trienoyl chloride
7,11-diethyltrideca-2,4,10-trienoyl chloride
8,12-dimethyltrideca-2,4,11-trienoyl chloride
7,10-dimethylundeca-2,4,9-trienoyl chloride
7,10-dimethyldodeca-2,4,9-trienoyl chloride
6,10-dimethylundeca-2,4,9-trienoyl chloride (VIII)

ethyl 3,7,11-trimethyl-thioltrideca-2,4,10-trienoate
ethyl 3,11-dimethyl-7-ethyl-thioltrideca-2,4,10-trienoate
ethyl 7,11-diethyl-3-methyl-thioltrideca-2,4,10-trienoate
ethyl 3,8,12-trimethyl-thioltrideca-2,4,11-trienoate
ethyl 3,7,10-trimethyl-thiolundeca-2,4,9-trienoate
ethyl 3,7,10-trimethyl-thioldodeca-2,4,9-trienoate
ethyl 3,6,10-trimethyl-thiolundeca-2,4,9-trienoate
ethyl 7,11-dimethyl-thioldodeca-2,4,10-trienoate
ethyl 7,11-dimethyl-thioltrideca-2,4,10-trienoate
ethyl 11-methyl-7-ethyl-thioltrideca-2,4,10-trienoate
ethyl 7,11-diethyl-thioltrideca-2,4,10-trienoate
ethyl 8,12-dimethyl-thioltrideca-2,4,11-trienoate
ethyl 7,10-dimethyl-thiolundeca-2,4,9-trienoate
ethyl 7,10-dimethyl-thioldodeca-2,4,9-trienoate
ethyl 6,10-dimethyl-thiolundeca-2,4,9-trienoate
etc.

Methylmercaptan is reacted with each of the trienoylchlorides above using the procedure of this example except that the reaction mixture is prepared at about −10° and the reaction is carried out in a sealed vessel to prepare the respective metthyl thiol ester, e.g.— methyl 3,7,11-trimethyl-thioldodeca-2,4,10-trienoate,
methyl 3,7,11-trimethyl-thioltrideca-2,4,10-trienoate,
methyl 3,11-dimethyl-7-ethyl-thioltrideca-2,4,10-trienoate,
etc.

EXAMPLE 17

3,7,11-trimethyltrideca - 3,4,10 - trienoyl chloride (18 g.) is added slowly to ethyl lead mercaptide (13.4 g.) covered with ether. The mixture is allowed to stand overnight and then is filtered. The filtrate is evaporated under reduced pressure to yield ethyl 3,7,11-trimethyl-thioltrideca-2,4,10-trienoate which can be purified by chromatography.

EXAMPLE 18

To a mixture of 24 g. of ethyl 3,7,11-trimethyl-thioldodeca-2,4,10-trienoate in 75 ml. of ether, cooled in an ice-bath, is slowly added 0.1 mole of perphthalic acid in ether. Then the reaction mixture is allowed to stand for about 30 minutes. The mixture, at room temperature, is shaken with dilute aqueous sodium hydroxide and then separated. The organic phase is washed with water, dried over magnesium sulfate and evaporated under reduced pressure to yield ethyl 10,11-txido-3,7,11-trimethyl-thioldodeca-2,4-dienoate, which is purified by chromatography on neutral silica gel.

The above process is repeated using each of the unsaturated esters under column VIII to prepare the respective epoxide under column IX.

(IX)

ethyl 10,11-oxido-3,7,11-trimethyl-thioltrideca-2,4-dienoate
ethyl 10,11-oxido-3,11-dimethyl-7-ethyl-thioltrideca-2,4-dienoate
ethyl 10,11-oxido-7,11-diethyl-3-methyl-thioltrideca-2,4-dienoate
ethyl 11,12-oxido-3,8,12-trimethyl-thioltrideca-2,4-dienoate
ethyl 9,10-oxido-3,7,10-trimethyl-thioltrideca-2,4-dienoate
ethyl 9,10-oxido-3,7,10-trimethyl-thioldodeca-2,4-dienoate
ethyl 9,10-oxido-3,6,10-trimethyl-thiolundeca-2,4-dienoate
ethyl 10,11-oxido-7,11-dimethyl-thioldodeca-2,4-dienoate
ethyl 10,11-oxido-7,11-dimethyl-thioltrideca-2,4-dienoate
ethyl 10,11-oxido-11-methyl-7-ethyl-thioltrideca-2,4-dienoate
ethyl 10,11-oxido-7,11-diethyl-thioltrideca-2,4-dienoate
ethyl 11,12-oxido-8,12-dimethyl-thioltrideca-2,4-dienoate
ethyl 9,10-oxido-7,10-dimethyl-thiolundeca-2,4-dienoate
ethyl 9,10-oxido-7,10-dimethyl-thioldodeca-2,4-dienoate
ethyl 9,10-oxido-6,10-dimethyl-thiolundeca-2,4-dienoate

EXAMPLE 19

To 0.60 g. of ethyl 10,11-oxido-3,7,11-trimethyl-thioldodeca-2,4-dienoate in 25 ml. of absolute ethanol is added 5 ml. of water and 1.0 g. of potassium thiocyanate. The mixture is heated at reflux for about 65 hours. Refluxing is stopped and the mixture poured into brine and extracted with ether. The ethereal extract is washed with brine, dried and evaporated to yield ethyl 10,11-epithio-3,7,11-trimethyl-thioldodeca-2,4-dienoate which can be purified by thin layer chromatography or distillation under vacuum.

The above process is repeated using each of the unsaturated esters under column IX to prepare the respective episulfide under column X.

(X)

ethyl 10,11-epithio-3,7,11-trimethyl-thioltrideca-2,4-dienoate
ethyl 10,11-epithio-3,11-dimethyl-7-ethyl-thioltrideca-2,4-dienoate
ethyl 10,11-epithio-7,11-diethyl-3-methyl-thioltrideca-2,4-dienoate
ethyl 11,12-epithio-3,8,12-trimethyl-thioltrideca-2,4-dienoate
ethyl 11,12-epithio-3,8,12-trimethyl-thioltrideca-2,4-dienoate
ethyl 9,10-epithio-3,7,10-trimethyl-thioldodeca-2,4-dienoate
ethyl 9,10-epithio-3,6,10-trimethyl-thiolundeca-2,4-dienoate
ethyl 10,11-epithio-7,11-dimethyl-thioldodeca-2,4-dienoate
ethyl 10,11-epithio-7,11-dimethyl-thioltrideca-2,4-dienoate
ethyl 10,11-epithio-11-methyl-7-ethyl-thioltrideca-2,4-dienoate
ethyl 10,11-epithio-7,11-diethyl-thioltrideca-2,4-dienoate
ethyl 11,12-epithio-8,12-dimethyl-thioltrideca-2,4-dienoate
ethyl 9,10-epithio-7,10-dimethyl-thiolundeca-2,4-dienoate
ethyl 9,10-epithio-7,10-dimethyl-thioldodeca-2,4-dienoate
ethyl 9,10-epithio-6,10-dimethyl-thiolundeca-2,4-dienoate

EXAMPLE 20

Fifteen grams of mercuric acetate in 50 ml. of dry ethanol is added to 12 g. of ethyl 3,7,11-trimethyl-thioldodeca-2,4,10-trienoate in 30 ml. of dry ethanol cooled in an ice bath. The temperature is allowed to come to room temperature by standing overnight. Then the mixture is cooled to 0°, 10 g. of potassium hydroxide in 150 ml. of ethanol is added followed by addition of 1.0 g. of sodium borohydride in small portions. After about 30 minutes at 0°, water is aded and the mixture left at rom temperature for two hours. The mixture is filtered, filtrate concentrated and extracted with ether. The ethereal extract is washed, dried and evaporated to yield ethyl 11-ethoxy-3,7,11-trimethyl-thioldodeca-2,4-dienoate which is purified by chromatography.

By using methanol in the foregoing process in place of ethanol, there is prepared the respective 11-methyl ether.

Using each of the esters under column VIII as the starting material in the process of this example, there is prepared the respective substituted ester under column XI.

(XI)

ethyl 11-ethoxy-3,7,11-trimethyl-thioltrideca-2,4-dienoate
ethyl 11-ethoxy-3,11-dimethyl-7-ethyl-thioltrideca-2,4-dienoate
ethyl 11-ethoxy-3,11-dimethyl-7-ethyl-thioltrideca-2,4-dienoate
ethyl 11-ethoxy-7,11-diethyl-3-methyl-thioltrideca-2,4-dienoate
ethyl 12-ethoxy-3,8,12-trimethyl-thioltrideca-2,4-dienoate
ethyl 10-ethoxy-3,7,10-trimethyl-thiolundeca-2,4-dienoate
ethyl 10-ethoxy-3,7,10-trimethyl-thioldodeca-2,4-dienoate
ethyl 10-ethoxy-3,6,10-trimethyl-thiolundeca-2,4-dienoate
ethyl 11-ethoxy-7,11-dimethyl-thioldodeca-2,4-dienoate
ethyl 11-ethoxy-7-ethyl-11-methyl-thioltrideca-2,4-dienoate
ethyl 11-ethoxy-7,11-diethyl-thioltrideca-2,4-dienoate
ethyl 12-ethoxy-8,12-dimethyl-thioltrideca-2,4-dienoate
ethyl 10-ethoxy-7,10-dimethyl-thiolundeca-2,4-dienoate
ethyl 10-ethoxy-7,10-dimethyl-thioldodeca-2,4-dienoate
ethyl 10-ethoxy-6,10-dimethyl-thiolundeca-2,4-dienoate

EXAMPLE 21

To a mixture of 1.9 g. of mercuric acetate, 6 ml. of water and 20 ml. of tetrahydrofuran is added 1.49 g. of ethyl 3,7,11-trimethyl-thioldodeca-2,4,10-trienoate slowly. After addition is complete, the reaction mixture is stirred for about 20 minutes. The mixture is cooled to about 0° and 6 ml. of aqueous sodium hydroxide (3 molar) is added followed by 0.49 g. of sodium borohydride in aqueous sodium hydroxide (about 3 molar). The mixture is stirred for about 30 minutes. The mixture is then decanted, concentrated, diluted with water and then extracted with ether. The ethereal extract is washed with water, dried over magnesium sulfate and the product chromatographed on silica ethyl 11-hydroxy-3,7,11-trimethyl-thioldodeca-2,4-dienoate.

The above process is repeated using each of the unsaturated esters under column VIII to prepare the respective compound under column XII.

(XII)

ethyl 11-hydroxy-3,7,11-trimethyl-thioltrideca-2,4-dienoate
ethyl 11-hydroxy-3,11-dimethyl-7-ethyl-thioltrideca-2,4-dienoate
ethyl 11-hydroxy-7,11-diethyl-3-methyl-thioltrideca-2,4-dienoate
ethyl 12-hydroxy-3,8,12-trimethyl-thioltrideca-2,4-dienoate
ethyl 10-hydroxy-3,7,10-trimethyl-thioulndeca-2,4-dienoate
ethyl 10-hydroxy-3,7,10-trimethyl-thioldodeca-2,4-dienoate
ethyl 10-hydroxy-3,6,10-trimethyl-thioulndeca-2,4-dienoate
ethyl 11-hydroxy-7,11-dimethyl-thioldodeca-2,4-dienoate
ethyl 11-hydroxy-7,11-dimethyl-thioltrideca-2,4-dienoate
ethyl 11-hydroxy-11-methyl-7-ethyl-thioltrideca-2,4-dienoate
ethyl 11-hydroxy-7,11-diethyl-thioltrideca-2,4-dienoate
ethyl 12-hydroxy-8,12-dimethyl-thioltrideca-2,4-dienoate
ethyl 10-hydroxy-7,10-dimethyl-thioulndeca-2,4-dienoate
ethyl 10-hydroxy-7,10-dimethyl-thioulndeca-2,4-dienoate
ethyl 10-hydroxy-6,10-dimethyl-thioulndeca-2,4-dienoate

EXAMPLE 22

A mixture of 1 g. of ethyl 11-hydroxy-3,7,11-trimethyl-thioldodeca-2,4-dienoate, 10 ml. of acetic anhydride and 0.5 g. of dry sodium acetate is refluxed for about five hours. After cooling, excess anhydride is removed by vacuum and the residue extracted with ether. The ethereal extract is washed, dried over magnesium sulfate and evaporated to yield the corresponding acetate, ethyl 11-acetoxy-3,7,11-trimethyl-thioldodeca-2,4-dienoate.

EXAMPLE 23

A mixture of 2 g. of dry ethyl 11-hydroxy-3,7,11-trimethyl-thioldodeca-2,4-dienoate, 15 ml. of acetyl chloride and 20 ml. of dry pyridine under nitrogen is heated on a steam bath for about six hours. After cooling, the mixture is concentrated under vacuum and the residue taken up in ether. The ethereal extract is washed, dried over magnesium sulfate and evaporated to yield the corresponding acetate, ethyl 11-acetoxy-3,7,11-trimethyl-thioldodeca-2,4-dienoate.

The process of this example is repeated with the exception of using triethylamine in place of pyridine to yield the 11-acetate.

EXAMPLE 24

A mixture of 20 ml. of dry formic acid and 2 g. of ethyl 3,7,11-trimethyl-thioldodeca - 2,4,10 - trienoate is heated at 50° for two hours and then poured onto ice cold potassium bicarbonate solution. The reaction is worked up by extraction with ether, washing the ethereal extract, drying over magnesium sulfate and evaporation to yield the formate of ethyl 11-hydroxy-3,7,11-trimethyl-thioldodeca-2,4-dienoate.

Using the above process, the formate of each of the tri-unsaturated esters of column VIII are prepared.

EXAMPLE 25

One gram of ethyl 11-hydroxy-3,7,11-trimethyl-thioldodeca-2,4-dienoate in 10 ml. of diglyme is added dropwise to a slurry of 1 g. of sodium hydride in 10 ml. of diglyme under nitrogen. To this mixture is added 0.9 g. of cyclohexylchloride. The reaction mixture is stirred at about 25° for 30 minutes and then quenched in ice water. The organic phase is separated and aqueous phase reextracted with ether. The organic materials are washed with water, dried over sodium sulfate and evaporated to yield the cyclohexyl ether of ethyl 11-hydroxy-3,7,-11-trimethyl-thioldodeca-2,4-dienoate.

By using each of the benzyl chloride and cyclopentyl chloride in the foregoing procedure, the corresponding benzyl ether and cyclopentyl ether is prepared.

EXAMPLE 26

By use of the procedure of Example 23, ethyl 11-hydroxy-3,7,11-trimethyl-thioldodeca-2,4-dienoate is converted into the corresponding 11-chloroacetate, 11-dichloroacetate and 11-trichloroacetate using chloracetyl chloride, dichloroacetyl chloride and trichloroacetyl chloride, respectively.

The respective 11-trifluoroacetate, propionate, n-butanoate, n-pentanotate and n-hexanoate esters of ethyl 11-hydroxy-3,7,11-trimethyl-thioldodeca-2,4-dienoate are prepared according to the process of Example 22 using trifluoroacetic anhydride, propionic anhydride, n-butyric anhydride, n-pentanoic anhydride and n-hexanoic anhydride or according to the process of Example 33 using the corresponding acid chloride.

EXAMPLE 27

Part A.—Into a mixture of 2 g. of ethyl 10,11-oxido-3,7,11-trimethyldodeca-2,4-dienoate in 150 ml. of ether, there is slowly introduced one equivalent of hydrogen chloride at 0°. The mixture is allowed to stand for about 12 hours. Then the mixture is washed with 5% aqueous sodium bicarbonate solution, dried over sodium sulfate and evaporated to yield a mixture of ethyl 11-chloro-10-hydroxy-3,7,11-trimethyldodeca-2,4-dienoate and ethyl 11-hydroxy-10-chloro - 3,7,11 - trimethyldodeca-2,4-dienoate which are separated by chromatography.

By using hydrogen bromide in place of hydrogen chloride, there is prepared ethyl 11-bromo-10-hydroxy-3,7,11-trimethyldodeca-2,4-dienoate and ethyl 11-hydroxy-10-bromo-3,7,11-trimethyldodeca-2,4-dienoate.

Part B.—To a stirred solution of 1 g. of ethyl 11-chloro-10-hydroxy-3,7,11-trimethyldodeca-2,4-dienoate in 10 ml. of acetone, cooled to 0°, is added under nitrogen, a solution of 8 N chromic acid (prepared by mixing chromium troxide, conc. sulfuric acid and water) until the color of the reagent persists in the mixture. The mixture is then stirred for one minute at 0–5° and diluted with water. The product is extracted with ether, washed with water and dried to yield ethyl 11-chloro-10-oxo-3,7,11-trimethyldodeca-2,4-dienoate.

Part C.—To 1 g. of ethyl 11-chloro-10-oxo-3,7,11-trimethyldodeca-2,4-dienoate in 2.0 ml. of dimethylformamide is added 26 mg. of sodium azide and the temperature brought to 85°. After about 3.5 hours, the reaction is cooled to room temperature. The reaction is diluted with pentane and water, separated and the aqueous phase extracted with pentane/ether. The combined organic phases are washed with saturated sodium chloride solution, dried over magnesium sulfate and solvent evaporated to yield ethyl 11-azido - 10 - oxo - 3,7,11 - trimethyldodeca-2,4-dienoate.

Part D.—To 0.9 g. of the above prepared azido ketone in 2.0 ml. of anhydrous methanol is added about 4 mg. of sodium borohydride. After about one hour, water and ether is added and the layers separated. The aqueous layer is extracted with ether and combined with the organic layer which is washed to neutrality using saturated sodium chloride. The organic phase is then dried over magnesium sulfate and solvent removed to yield ethyl 11-azido-10-hydroxy-3,7,11-trimethyldodeca-2,4-dienoate. Using silica gel, the diastereomeric azide alcohols can be resolved, if desired.

Part E.—A solution of 80 mg. of crude ethyl 11-azido-10 - hydroxy-3,7,11-trimethyldodeca-2,4-dienoate and 10 ml. of a 0.3 M triethylamine in pentane is cooled to —5°. Then 200 mg. of mesyl chloride is added. After 45 minutes, the reaction is poured onto ice and ether is added. The organic phase is washed with dilute HCl, saturated sodium bicarbonate, saturated sodium chloride and then dried over sodium sulfate and solvent removed to yield the corresponding 10-mesylate.

Part F.—Anhydrous $CoBr_2$ (146 mg.) is dissolved in 10 ml. of absolute ethanol and then 312 mg. of dipyridyl is added followed by 76 mg. of sodium borohydride at 0° under argon.

To 35 mg. of the above prepared 10-mesylate in 0.8 ml. of ethanol at 0°, under argon, is added 0.20 ml. of the above prepared reducing solution and after several minutes an additional 0.5 ml. of the reducing solution is added. After 0.5 hour, the reaction is poured into water and ether added. The organic phase is washed with saturated sodium chloride solution, dried over magnesium sulfate and solvent removed to yield ethyl 10,11-imino-3,7,11-trimethyldodeca-2,4-dienoate which can be purified by chromatography.

Example 28

Following the processes of parts A and B of Example 27, each of the epoxides under column XIII is converted into the respective halohydrins, the chloro-hydroxy derivative separated and oxidized to prepare the respective chloroketone under column XIV.

(XIII)

ethyl 10,11-oxido-3,7,11-trimethyltrideca-2,4-dienoate
ethyl 10,11-oxido-3,11-dimethyl-7-ethyltrideca-2,4-dienoate
ethyl 10,11-oxido-7,11-diethyl-3-methyltrideca-2,4-dienoate
ethyl 11,12-oxido-3,8,12-trimethyltrideca-2,4-dienoate
ethyl 9,10-oxide-3,7,10-trimethylundeca-2,4-dienoate
ethyl 9,10-oxido-3,7,10-trimethyldodeca-2,4-dienoate
ethyl 9,10-oxido-3,6,10-trimethylundeca-2,4-dienoate
ethyl 10,11-oxido-7,11-dimethyldodeca-2,4-dienoate
ethyl 10,11-oxido-7,11-dimethyltrideca-2,4-dienoate
ethyl 10,11-oxido-11-methyl-7-ethyltrideca-2,4-dienoate
ethyl 10,11-oxido-7,11-diethyltrideca-2,4-dienoate
ethyl 11,12-oxido-8,12-dimethyltrideca-2,4-dienoate
ethyl 9,10-oxido-7,10-dimethylundeca-2,4-dienoate
ethyl 9,10-oxido-7,10-dimethyldodeca-2,4-dienoate
ethyl 9,10-oxido-6,10-dimethylundeca-2,4-dienoate (XIV)

ethyl 11-chloro-10-oxo-3,7,11-trimethyltrideca-2,4-dienoate
ethyl 11-chloro-10-oxo-3,11-dimethyl-7-ethyltrideca-2,4-dienoate
ethyl 11-chloro-10-oxo-7,11-diethyl-3-methyltrideca-2,4-dienoate
ethyl 12-chloro-10-oxo-3,8,12-trimethyltrideca-2,4-dienoate
ethyl 10-chloro-9-oxo-3,7,10-trimethylundeca-2,4-dienoate
ethyl 10-chloro-9-oxo-3,7,10-trimethyldodeca-2,4-dienoate
ethyl 10-chloro-9-oxo-3,6,10-trimethylundeca-2,4-dienoate
ethyl 11-chloro-10-oxo-7,11-dimethyldodeca-2,4-dienoate
ethyl 11-chloro-10-oxo-7,11-dimethyltrideca-2,4-dienoate
ethyl 11-chloro-10-oxo-11-methyl-7-ethyltrideca-2,4-dienoate
ethyl 11-chloro-10-oxo-7,11-diethyltrideca-2,4-dienoate
ethyl 12-chloro-11-oxo-8,12-dimethyltrideca-2,4-dienoate
ethyl 10-chloro-9-oxo-7,10-dimethylundeca-2,4-dienoate
ethyl 10-chloro-9-oxo-7,10-dimethyldodeca-2,4-dienoate
ethyl 10-chloro-9-oxo-6,10-dimethylundeca-2,4-dienoate

EXAMPLE 29

Following the processes of parts C, D, E and F of Example 27, successively, using the chloroketones under column XIV as the starting material, there is prepared the respective azido-ketone, azido-hydroxy compound and azido-mesylate which is converted into the respective aziridine under column XV.

(XV)

ethyl 10,11-imino-3,7,11-trimethyltrideca-2,4-dienoate
ethyl 10,11-imino-3,11-dimethyl-7-ethyltrideca-2,4-dienoate
ethyl 10,11-imino-7,11-diethyl-3-methyltrideca-2,4-dienoate
ethyl 11,12-imino-3,8,12-trimethyltrideca-2,4-dienoate
ethyl 9,10-imino-3,7,10-trimethylundeca-2,4-dienoate
ethyl 9,10-imino-3,7,10-trimethyldodeca-2,4-dienoate
ethyl 9,10-imino-3,6,10-trimethylundeca-2,4-dienoate
ethyl 10,11-imino-7,11-dimethyldodeca-2,4-dienoate
ethyl 10,11-imino-7,11-dimethyltrideca-2,4-dienoate
ethyl 10,11-imino-11-methyl-7-ethyltrideca-2,4-dienoate
ethyl 10,11-imino-7,11-diethyltrideca-2,4-dienoate
ethyl 11,12-imino-8,12-dimethyltrideca-2,4-dienoate
ethyl 9,10-imino-7,10-dimethylundeca-2,4-dienoate
ethyl 9,10-imino-7,10-dimethyldodeca-2,4-dienoate
ethyl 9,10-imino-6,10-dimethylundeca-2,4-dienoate

EXAMPLE 30

Each of the amines of Eaxmples 8 and 9 is epoxidized using the process of Example 18 to prepare the respective epoxides, i.e.—

10,11-oxido-3,7,11-trimethyldodeca-2,4-dienylamine,
10,11-oxido-3,7,11-trimethyltrideca-2,4-dienylamine,
10,11-oxido-3,11-dimethyl-7-ethyltrideca-2,4-dienylamine,
N,N-diethyl 10,11-oxido-3,7,11-trimethyldodeca-2,4-dienylamine,
N,N-diethyl 10,11-oxido 3,7,11-trimethyltrideca-2,4-dienylamine,
N,N-diethyl 10,11-oxido-3,11-dimethyl-7-ethyltrideca-2,4-dienylamine,
N,N-dimethyl 10,11-oxido-3,7,11-trimethyldodeca-2,4-dienylamine,
N,N-dimethyl 10,11-oxido-3,7,11-trimethyltrideca-2,4-dienylamne,
N,N dimethyl 10,11-oxido-3,11-dimethyl-7-ethyltrideca-2,4-dienylamine, etc.

EXAMPLE 31

Each of the tri-unsaturated nitriles of Example 5 is converted into the respective epoxide using the process of Example 18. Thus, there is prepared—

10,11-oxido-3,7,11-trimethyltrideca-2,4-dienenitrile,
10,11-oxido-3,11-dimethyl-7-ethyltrideca-2,4-dienenitrile,
10,11-oxido-3-methyl-7,11-diethyltrideca-2,4-dienenitrile,
11,12-oxido-3,8,12-trimethyltrideca-2,4-dienenitrile,
9,10-oxido-3,7,10-trimethylundeca-2,4-dienenitrile,
9,10-oxido-3,7,10-trimethyldodeca-2,4-dienenitrile,
9,10-oxido-3,6,10-trimethylundeca-2,4-dienenitrile.

EXAMPLE 32

Each of the tri-unsaturated alcohols and ethers of Examples 6 and 10 to 12 is epoxidized using the process of Example 18 to prepare the terminal epoxide. For example;

10,11-oxido-3,7,11-trimethyldodeca-2,4-dien-1-ol,
10,11-oxido-3,7,11-trimethyltrideca-2,4-dien-1-ol,
1-ethoxy-10,11-oxido-3,7,11-trimethyldodeca-2,4-diene,
1-ethoxy-10,11-oxido-3,11-dimethyl-7-ethyltrideca-2,4-diene,
1-ethoxy-10,11-oxido-3,11-dimethyl-7-ethyltrideca-2,4-diene,
1-methoxy-10,11-oxido-3,7,11-trimethyldodeca-2,4-diene, etc.

EXAMPLE 33

(A) By use of the process of Example 20, ethanol is added to the terminal bond of each of the tri-unsaturated alcohols and ethers of Examples 6 and 10 to 12 to produce the respective ethoxy derivative, for example;
11-ethoxy-3,7-trimethyldodeca-2,4-dien-1-ol,
11-ethoxy-3,7,11-trimethyltrideca-2,4-dien-1-ol,
11-ethoxy-3,11-dimethyl-7-ethyltrideca-2,4-dien-1-ol,
1,11-diethoxy-3,7,11-trimethyldoca-2,4-diene,
1,11-diethoxy-3,7,11-trimethyltrideca-2,4-diene,
1,11-diethoxy-3,11-dimethyl-7-ethyltrideca-2,4-diene,
1-methoxy-11-ethoxy-3,7,11-trimethyldodeca-2,4-diene, etc.

(B) By use of the process of Example 21, water is added to the terminal double bond of the tri-unsaturated alcohols and ethers of Examples 6 and 10 to 12 to produce the respective hydroxy derivative, for example;

3,7,11-trimethyldodeca-2,4-diene-1,11-diol,
3,7,11-trimethyltrideca-2,4-diene-1-11-diol,
3,11-dimethyl-7-ethyltrideca-2,4-diene-1,11-diol,
1-ethoxy-11-hydroxy-3,7,11-trimethyldodeca-2,4-diene,
1-ethoxy-11-hydroxy-3,7,11-trimethyltrideca-2,4-diene,
1-ethoxy-11-hydroxy-3,11-dimethyl-7-ethyltrideca-2,4-diene,
1-methoxy-11-hydroxy-3,7,11-trimethyldodeca-2,4-diene, etc.

(C) The process of part A can be repeated to add alcohols other than ethanol such as methanol as explained hereinabove to obtain other ethers. The free hydroxyl compounds of part B can be esterified using the procedure of, e.g., Examples 22, 23, and 26 to form the respective esters.

EXAMPLE 24

(A) By use of the process of Example 20, each of methanol and ethanol is added to terminal double bond of tri-unsaturated amines of Formula A to produce the respective methoxy derivative and ethoxy derivative, e.g.—

N,N-diethyl 11-methoxy-3,7,11-trimethyldodeca-2,4-dienylamine,
N,N-diethyl 11-ethoxy-3,7,11-trimethyldodeca-2,4-dienylamine,
N,N-diethyl 11-methoxy-3,7,11-trimethyltrideca-2,4-dienylamine,
N,N-diethyl-11-ethoxy-3,7,11-trimethyltrideca-2,4-dienylamine,
N,N-diethyl-11-methoxy-3,11-dimethyl-7-ethyltrideca-2,4-dienylamine,
N,N-diethyl-11-ethoxy-3,11-dimethyl-7-ethyltrideca-2,4-dienylamine,
N,N-dimethyl-11-methoxy-3,7,11-trimethyldodeca-2,4-dienylamine
N-ethyl-11-methoxy-3,7,11-trimethyldodeca-2,4-dienylamine
N-methyl-11-methoxy-3,7,11-trimethyldodeca-2,4-dienylamine, etc.

Similarly, using the process of Example 20, each of methanol and ethanol is added to the terminal double bond of the tri-unsaturated nitriles and C–1 halides of Formula A to prepare the respective methoxy and ethoxy derivatives of the present invention, e.g.—

11-methoxy-3,7,11-trimethyldodeca-2,4-dienenitrile,
11-ethoxy-3,7,11-trimethyldodeca-2,4-dienenitrile,
11-methoxy-3,7,11-trimethyltrideca-2,4-dienenitrile,
11-ethoxy-3,7,11-trimethyltrideca-2,4-dienenitrile,
11-methoxy-3,11-dimethyl-7-ethyltrideca-2,4-dienenitrile,
11-ethoxy-3,11-dimethyl-7-ethyltrideca-2,4-dienenitrile,
11-methoxy-3,7,11-trimethyldodeca-2,4-dienyl bromide,
11-ethoxy-3,7,11-trimethyldodeca-2,4-dienyl bromide,
11-methoxy-3,7,11-trimethyltrideca-2,4-dienyl bromide,
11-ethoxy-3,7,11-trimethyltrideca-2,4-dienyl bromide,
11-methoxy-3,11-dimethyl-7-ethyltrideca-2,4-dienyl bromide,
11-ethoxy-3,11-dimethyl-7-ethyltrideca-2,4-dienyl bromide,
11-methoxy-3,7,11-trimethyldodeca-2,4-dienyl chloride
11-ethoxy-3,7,11-trimethyldodeca-2,4-dienyl chloride, etc.

(B) By use of the process of Example 21, water is added to the terminal double bond of the tri-unsaturated amines, nitriles and C-1 halides of Formula A to produce the respective hydroxy derivatives, e.g.—

N,N-diethyl 11-hydroxy-3,7,11-trimethyldodeca-2,4-dienylamine,
N,N-diethyl 11-hydroxy-3,7,11-trimethyltrideca-2,4-dienylamine,
N,N-diethyl 11-hydroxy-3,11-dimethyl-7-ethyltrideca-2,4-dienylamine,
N,N-dimethyl-11-hydroxy-3,7,11-trimethyldodeca-2,4-dienylamine,
N,N-dimethyl-11-hydroxy-3,7,11-trimethyltrideca-2,4-dienylamine,
N,N-dimethyl-11-hydroxy-3,11-dimethyl-7-ethyltrideca-2,4-dienylamine,
N-ethyl-11-hydroxy-3,7,11-trimethyldodeca-2,4-dienylamine,
N-methyl-11-hydroxy-3,7,11-trimethyldodeca-2,4-dienylamine,
11-hydroxy-3,7,11-trimethyldodeca-2,4-dienenitrile,
11-hydroxy-3,7,11-trimethyltrideca-2,4-dienenitrile,
11-hydroxy-3,11-dimethyl-7-ethyltrideca-2,4-dienenitrile,
11-hydroxy-3,7,11-trimethyldodeca-2,4-dienyl bromide,
11-hydroxy-3,11-dimethyl-7-ethyltrideca-2,4-dienyl bromide,
11-hydroxy-3,7,11-trimethyldodeca-2,4-dienyl chloride, etc.

The thus-prepared free hydroxy compounds can be esterified using the procedure of, e.g., Examples 22, 23 and 26 to form the respective esters, e.g. the respective 11-acetate.

EXAMPLE 35

To a mixture of 2 g. of methyl 3,7,11-trimethyl-thioltrideca-2,4,10-trienoate in 150 ml. of methylene chloride at 0° is slowly added 1.0 molar equivalent of m-chloroperbenzoic acid in 100 ml. of methylene chloride. The resulting mixture is allowed to stand for 30 minutes at 0° and then washed with 2% aqueous sodium sulfite solution, with 5% aqueous sodium bicarbonate solution and with water, dried over sodium sulfate and evaporated to yield methyl 10,11-oxido-3,7,11-trimethyl-thiododeca-2,4-dienoate which is purified by chromatography.

EXAMPLE 36

(A) Anhydrous hydrogen chloride is bubbled into 100 ml. of dry carbon tetrachloride at 0° until one equivalent is taken up. Five grams of ethyl 3,7,11-trimethyl-thioldodeca-2,4,10-trienoate is added and the resulting mixture allowed to stand for about 48 hours at −20°. The mixture is evaporated under reduced pressure to yield ethyl 11-chloro-3,7,11-trimethylthioldodeca-2,4-dienoate which is purified by chromatography.

The above process is repeated using each of the unsaturated compounds under column VIII to prepare the respective chloride under column XVI.

XVI
ethyl 11-chloro-3,7,11-trimethyl-thioltrideca-2,4-dienoate
ethyl 11-chloro-3,11-dimethyl-7-ethyl-thioltrideca-2,4-dienoate
ethyl 11-chloro-7,11-diethyl-3-methyl-thioltrideca-2,4-dienoate
ethyl 12-chloro-3,8,12-trimethyl-thioltrideca-2,4-dienoate
ethyl 10-chloro-3,7,10-trimethyl-thioundeca-2,4-dienoate
ethyl 10-chloro-3,7,10-trimethyl-thioldodeca-2,4-dienoate
ethyl 10-chloro-3,6,10-trimethyl-thioundeca-2,4-dienoate
ethyl 11-chloro-7,11-dimethyl-thioldodeca-2,4-dienoate
ethyl 11-chloro-7,11-dimethyl-thioltrideca-2,4-dienoate
ethyl 11-chloro-11-methyl-7-ethyl-thioltrideca-2,4-dienoate
ethyl 11-chloro-7,11-diethyl-thioltrideca-2,4-dienoate
ethyl 12-chloro-8,12-dimethyl-thioltrideca-2,4-dienoate
ethyl 10-chloro-7,10-dimethyl-thioundeca-2,4-dienoate
ethyl 10-chloro-7,10-dimethyl-thioldodeca-2,4-dienoate
ethyl 10-chloro-6,10-dimethyl-thioundeca-2,4-dienoate By using each of hydrogen bromide and hydrogen fluoride in the above process, the respective bromides and fluorides are prepaid, e.g. ethyl 11-bromo-3,7,11-trimethyl-thioldodeca-2,4-dienoate, ethyl 11-fluoro-3,7,11-trimethyl-thioldodeca-2,4-dienoate, etc.

(B) Chlorine gas is bubbled into 200 ml. of carbon tetrachloride at 0° until one equivalent is taken up. Twenty-five grams of ethyl 3,7,11-trimethyl-thioldodeca-2,4,10-trienoate is added and the mixture stirred and then allowed to stand at about −20° for 24 hours. The mixture is then evaporated to yield ethyl 10,11-dichloro-3,7,11-trimethyl-thioldodeca-2,4-dienoate which can be purified by chromatography.

By repeating the above process using the tri-unsaturated ester under column VIII, the respective dichloro dienoates are prepared, i.e., ethyl 10,11-dichloro-3,7,11-trimethyl-thioltrideca-2,4-dienoate, ethyl 10,11-dichloro-3,11-dimethyl-7-ethyl-thioltrideca-2,4-dienoate, etc.

By using bromine in place of chlorine in the foregoing process, the respective dibromo derivatives are prepared, i.e., ethyl 10,11-dibromo-3,7,11-trimethyl-thioldodeca-2,4-dienoate, etc.

(C) To a mixture of 5 g. of ethyl 3,7,11-trimethyl-thioldodeca-2,4,10-trienoate in 100 ml. of fluorotrichloromethane is slowly added one equivalent of anhydrous fluorine at about −78°. After stirring the mixture at this temperature for about 16 hours, the resultant mixture is evaporated and chromatographed on silica to yield ethyl 10,11-difluoro-3,7,11-trimethyl-thioldodeca-2,4-dienoate.

By repeating the above process using the tri-unsaturated esters under column VIII, the respective difluoro dienoates are prepared, i.e., ethyl 10,11-difluoro-3,7,11-trimethyl-thioltrideca-2,4-dienoate, etc.

EXAMPLE 37

The process of Example 27(A) is repeated using the epoxides of Example 18 to prepare the respective halohydrins, e.g., ethyl 11-chloro-10-hydroxy-3,7-11-trimethyl-thioldodeca-2,4-dienoate, ethyl 11-hydroxy-10-chloro-3,7,11-trimethyl-thioldodeca-2,4-dienoate, ethyl 11-chloro-10-hydroxy-3,7,11-trimethyl - thioltrideca-2,4-dienoate, ethyl 11-hydroxy-10-chloro - 3,7,11 - trimethyl-thioltrideca-2,4-dienoate, etc.

Similarly, other halohydrins of Formula A are prepared using the procedure of Example 27(A). For example, the epoxides of Examples 30, 31 and 32 in the process of Example 27(A) yield N,N-diethyl 11-chloro-10-hydroxy-3,7,11-trimethyl-dodeca-2,4-dienylamine,
N,N-diethyl 11-hydroxy-10-chloro-3,7,11-trimethyl-dodeca-2,4-dienylamine,
N,N-diethyl 11-chloro-10-hydroxy-3,7,11-trimethyl-trideca-2,4-dienylamine,
N,N-diethyl 11-hydroxy-10-chloro-3,7,11-trimethyl-trideca-2,4-dienylamine,
11-chloro-10-hydroxy-3,7,11-trimethyl-dodeca-2,4-dienenitrile,
11-hydroxy-10-chloro-3,7,11-trimethyldodeca-2,4-dienenitrile,
11-chloro-10-hydroxy-3,7,11-trimethyl-trideca-2,4-dienenitrile,
11-hydroxy-10-chloro-3,7,11-trimethyl-trideca-2,4-dienenitrile
1-ethoxy-11-chloro-10-hydroxy-3,7,11-trimethyldodeca-2,4-diene,
1-ethoxy-11-hydroxy-10-chloro-3,7,11-trimethyl-dodeca-2,4-diene,
1-methoxy-11-chloro-10-hydroxy-3,7,11-trimethyl-dodeca-2,4-diene,
1-methoxy-11-hydroxy-10-chloro-3,7,11-trimethyl-dodeca-2,4-diene,
11-chloro-3,7,11-trimethyldodeca-2,4-diene-1,10-diol,
10-chloro-3,7,11-trimethyldodeca-2,4-diene-1,11-diol, etc.

EXAMPLE 38

Following the procedure of Example 27(B), ethyl 11-chloro-10-oxo-3,7,11-trimethyl-thioldodeca-2,4-dienoate is prepared from ethyl 11-chloro-10-hydroxy-3,7,11-trimethyl-thioldodeca-2,4-dienoate. Ethyl 11-chloro-10-oxo-3,7,11-trimethyl-thioldodeca-2,4-dienoate is used as the starting material in the reaction sequence of Example 27, parts C, D, E and F to prepare ethyl 10,11-imino-3,7,11-trimethyl-thioldodeca-2,4-dienoate. In the same way, other 11-chloro-10-hydroxy or 11-bromo-10-hydroxy compounds of Formula A such as those of Example 37 are converted into the respective aziridine (Z' taken with Z is imino) as the final product.

EXAMPLE 39

By use of the process of Example 39(A), other monochloride, bromide and fluoride compounds (Z' is chloro, bromo or fluoro, Z is hydrogen) of Formula A are prepared from the respective tri-unsaturated compound (Z' taken with Z is a carbon-carbon bond) of Formula A such as the tri-unsaturated compounds of Examples 5 through 15. For example, from the respective triunsaturated precursor, there is prepared—

11-chloro-3,7,11-trimethyldodeca-2,4-dienenitrile,
11-chloro-3,7,11-trimethyltrideca-2,4-dienenitrile,
11-chloro-3,7,11-trimethyldodeca-2,4-dien-1-ol,
11-chloro-3,7,11-trimethyltrideca-2,4-dien-1-ol,
11-chloro-3,7,11-trimethyldodeca-2,4-dienyl bromide,
11-chloro-3,7,11-trimethyltrideca-2,4-dienyl bromide,
11-chloro-3,7,11-trimethyldodeca-2,4-dienylamine,
11-chloro-3,7,11-trimethyltrideca-2,4-dienylamine
N,N-diethyl 11-chloro-3,7,11-trimethyldodeca-2,4-dienylamine
N,N-diethyl 11-chloro-3,7,11-trimethyltrideca-2,4-dienylamine
1-ethoxy-11-chloro-3,7,11-trimethyldodeca-2,4-diene,
1-ethoxy-11-chloro-3,7,11-trimethyltrideca-2,4-diene,
11-chloro-3,7,11-trimethyldodeca-2,4-dienylmercaptan,
11-chloro-3,7,11-trimethyldodeca-2,4-dienyl thiomethane, etc.

By use of the process of Example 36(B) and (C), other dichloro,dibromo and difluoro compounds (each of Z' and Z is chloro, bromo or fluoro) of Formula A are prepared from the respective triunsaturated compound of Formula A such as the triunsaturated compounds of Examples 5 through 15. For example, from the respective triunsaturated precursor, there is prepared;

10,11-dichloro-3,7,11-trimethyldodeca-2,4-dienenitrile,
10,11-dichloro-3,7,11-trimethyltrideca-2,4-dienenitrile,
10,11-dichloro-3,7,11-trimethyldodeca-2,4-dien-1-ol,
10,11-dichloro-3,7,11-trimethyltrideca-2,4-dien-1-ol,
10,11-dichloro-3,7,11-trimethyldodeca-2,4-dienyl bromide,
10,11-dichloro-3,7,11-trimethyltrideca-2,4-dienyl bromide, 10,11-dichloro-3,7,11-trimethyldodeca-2,4-dienylamine
10,11-dichloro-3,7,11-trimethyltrideca-2,4-dienylamine
N,N-diethyl 10,11-dichloro-3,7,11-trimethyldodeca-
  2,4-dienylamine,
N,N-diethyl 10,11-dichloro-3,7,11-trimethyltrideca-
  2,4-dienylamine,
1-ethoxy-10,11-dichloro-3,7,11-trimethyl-
  dodeca-2,4-diene,
1-ethoxy-10,11-dichloro-3,7,11-trimethyltrideca-2,4-diene,
10,11-dichloro-3,7,11-trimethyldodeca-
  2,4-dienylmercaptan,
10,11-dichloro-3,7,11-trimethyldodeca-
  2,4-dienyl thiomethane, etc.

EXAMPLE 40

(A) To a solution of 1.8 g. of 6,10-dimethylundeca-3,9-dien-2-one in 20 ml. of ethanol, cooled to 0° by an ice bath, is added a suspension of 2.32 g. of mercuric acetate in 50 ml. of ethanol over 15 minutes. The reaction mixture is stirred for two hours and then, with cooling, to −20°, 1.22 g. of potassium hydroxide in 20 ml. of ethanol is added. Then 0.139 g. of sodium borohydride is added in small portions and stirring continued for 30 minutes at −20°. The solution is decanted, then concentrated to half volume, diluted with 100 ml. of water and extracted with ether (3× 50). The ethereal phase is washed with water, dried over magnesium sulfate and the crude product chromatographed on silica to yield 10-ethoxy-6,10-dimethylundec-3-en-2-one.

The process of this example is repeated using each of the compounds under column II as the starting material to prepare the respective ethoxy substituted compound under column XVII.

(XVII)

10-ethoxy-6,10-dimethyldodec-3-en-2-one
10-ethoxy-6-methyl-10-ethyldodec-3-en-2-one
10-ethoxy-6,10-diethyldodec-3-en-2-one
11-ethoxy-7,11-dimethyldodec-3-en-2-one
9-ethoxy-6,9-dimethyldec-3-en-2-one
9-ethoxy-6,9-dimethylundec-3-en-2-one
9-ethoxy-5,9-dimethyldec-3-en-2-one Following the process of Example 5, 10-ethoxy-6,10-dimethylundec-3-en-2-one is converted into 11-ethoxy-3,7,11-trimethyldodeca - 2,4 - dienenitrile. Reaction of 10-ethoxy-6,10-dimethylundec-3-en-2-one with the carbanion of diethyl carboethoxymethylphosphonate yield ethyl 11-ethoxy-3,7,11-trimethyldodeca-2,4-dienoate.

By using other alcohols in the process of this example in lieu of ethanol, such as methanol, etc., the respective ethers are obtained, e.g. 10-methoxy-6,10-dimethylundec-3-en-2-one.

(B) The process of part A is repeated using as the starting material 3,7-dimethyloct-6-en-1-al and each of the aldehydes under column I to prepare the respective compounds under column XVIII.

(XVIII)

7-ethoxy-3,7-dimethyloctan-1-al
7-ethoxy-3,7-dimethylnonan-1-al
7-ethoxy-3-methyl-7-ethylnonan-1-al
7-ethoxy-3,7-diethylnonan-1-al
8-ethoxy-4,8-dimethylnonan-1-al
6-ethoxy-3,6-dimethylheptan-1-al
6-ethoxy-3,6-dimethyloctan-1-al
6-ethoxy-2,6-dimethylheptan-1-al Using 7-ethoxy-3,7-dimethyloctan-1-al as the starting material in the process of either Example 1, 2 or 3, there is prepared 10-ethoxy-6,10-dimethylundec-3-en-2-one.

EXAMPLE 41

(A) To a mixture of about 20 g. of 6,10-dimethyl-undeca-3,9-dien-2-one in 75 ml. of ether, cooled in an ice-bath, is slowly added 0.1 mole of perphthalic acid in ether. Then the reaction mixture is allowed to stand for about 30 minutes. The mixture, at room temperature, is shaken with dilute aqueous sodium hydroxide and then separated. The organic phase is washed with water, dried over magnesium sulfate and evaporated under reduced pressure to yield 9,10-oxido-6,10-dimethylundec-3-en-2-one which is purified by chromatography on neutral silica gel.

The above process is repeated using each of the ketones under column II as the starting material to prepare the respective epoxide, i.e., 9,10-oxido-6,10-dimethyldodec-3-en-2-one, 9,10 - oxido-6-methyl-10-ethyldodec-3-en-2-one, etc.

By use of the process of Example 5, 10, 11-oxido-3,7,11-trimethyldodeca-2,4-dienenitrile is prepared from 9,10-oxido-6,10-dimethylundec-3-en-2-one.

(B) To a mixture of 2 g. of 3,7-dimethyloct-6-en-1-al in 100 ml. of methylene chloride at 0° is slowly added 1.0 molar equivalent of m-chloroperbenzoic acid in 75 ml. of methylene chloride. The resulting mixture is allowed to stand for 30 minutes at 0° and then washed with 2% aqueous sodium sulfite solution, with 5% aqueous sodium bicarbonate solution and with water, dried over sodium sulfate and evaporated to yield 6,7-oxido-3,7-dimethyloctan-1-al which is purified by chromatography.

Using the above process each of the aldehydes under column I is converted into the respective epoxide, i.e., 6,7 - oxide-3,7-dimethylnonan-1-al, 6,7-oxido-3-methyl-7-ethylnonan-1-al, etc.

By use of the process of Example 1, 2 or 3, 9,10-oxido-6,10-dimethylundec-3-en-2-one is prepared from 6,7-oxido-3,7-dimethyloctan-1-al.

EXAMPLE 42

By use of the process of Example 19, other episulfides (Z′ taken with Z is epithio) of Formula A are prepared from the respective epoxide (Z′ taken with Z is oxido) of Formula A such as the epoxides of Examples 30 and 31 (as well as the epoxides of Example 41 to form episulfide ketones and aldehydes). For example, from the respective epoxide, there is prepared;

N,N-diethyl 10,11-epithio-3,7,11-trimethyldodeca-2,4-
  dienylamine,
N,N-diethyl 10,11-epithio-3,7,11-trimethyltrideca-2,4-
  dienylamine,
N,N-dimethyl 10,11-epithio-3,7,11-trimethyldodeca-2,4-
  dienylamine,
10,11-epithio-3,7,11-trimethyldodeca-2,4-dienenitrile,
10,11-epithio-3,7,11-trimethyltrideca-2,4-dienenitrile,
1-ethoxy-10,11-epithio-3,7,11-trimethyldodeca-2,4-diene,
1-methoxy-10,11-epithio-3,7,11-trimethyldodeca-2,4-
  diene,
1-ethoxy-10,11-epithio-3,7,11-trimethyltrideca-2,4-
  diene,
1-methoxy-10,11-epithio-3,7,11-trimethyltrideca-2,4-
  diene, etc.

Similarly, the epoxides of Example 4, e.g. 9,10-oxido-6,10 - dimethylundec-3-en-2-one, 6,7 - oxido-3,7-dimethyloctan-1-al, etc. are converted into the respective episulfide, e.g. 9,10-epithio-6,10-dimethylundec-3-ene-2-one, 6,7-epithio-3,7-dimethyloctan-1-al, etc. These episulfides serve as useful intermediates for the preparation of esters, nitriles, etc., using procedures described above.

What is claimed is:

1. A compound selected from those of the formula:

$$R^4-\underset{\underset{S}{\diagdown\diagup}}{C}-CH-(CH_2)_n-\overset{R^2}{\underset{|}{C}H}-(CH_2)_m-HC=CH-\overset{R^1}{\underset{|}{C}}=CH-\overset{O}{\overset{\|}{C}}-SR^{10}$$

wherein,
  $m$ is zero or the positive integer one, two or three;
  $n$ is the positive integer one, two or three;
  $R^1$ is hydrogen or lower alkyl;
  each of $R^2$, $R^3$ and $R^4$ is lower alkyl; and
  $R^{10}$ is low alkyl.

2. A compound according to claim 1 wherein $R^1$ is hydrogen or methyl and each of $R^2$, $R^3$ and $R^4$ is methyl or ethyl.

3. A compound according to claim 2 wherein $m$ is one and $n$ is one or two.

4. A compound according to claim 2 wherein $R^{10}$ is methyl or ethyl and $R^1$ is methyl.

5. A compound according to claim 2 wherein $R^{10}$ is methyl or ethyl and $R^1$ is hydrogen.

6. A compound according to claim 4 wherein $R^{10}$ is ethyl; $n$ is two; and each of $R^2$, $R^3$ and $R^4$ is methyl.

7. A compound according to claim 4 wherein $R^{10}$ is ethyl; $n$ is one; each of $R^2$ and $R^3$ is methyl; and $R^4$ is ethyl.

8. A compound according to claim 4 wherein $R^{10}$ is ethyl; $n$ is two; each of $R^2$ and $R^4$ is ethyl; and $R^3$ is methyl or ethyl.

9. A compound according to claim 4 wherein $R^{10}$ is ethyl; $n$ is two; each of $R^2$ and $R^3$ is methyl; and $R^4$ is ethyl.

References Cited

UNITED STATES PATENTS 3,510,290  5/1970  Doyle ---------------- 71—90

CECILIA M. S. JAISLE, Primary Examiner

U.S. Cl. X.R.

260—239 E, 240 R, 247, 247.1, 247.2, 247.5 R, 247.7 A, 247.7 G, 268 H, 268 R, 293.67, 293.68, 293.69, 293.72, 293.8, 293.81, 293.82, 293.83, 293.84, 326.3, 326.5 SM, 326.5 D, 326.5 G, 326.5 R, 326.5 M, 326.8, 326.82, 326.85, 348 R, 348 A, 399, 464, 465 D, 465 F, 465 G, 465.4, 465.6, 465.7, 469, 471 R, 476 R, 482 R, 484 R, 486 H, 486 R, 487, 488 H, 563 R, 563 D, 570.5 R, 570.5 CA, 571, 574, 576, 577, 578, 590, 593 H, 593 R, 609 D, 609 E, 611 R, 611 A, 612 R, 612 D, 613 R, 613 D, 614 R, 614 F, 615 R, 617 R, 618 D, 619 R, 621 R, 623 D, 632 R, 633, 635 R, 653.3, 654 R; 424— 244, 248, 250, 267, 274, 275, 278, 304, 305, 308, 311, 312, 314, 325, 330, 337, 339, 340, 341, 342, 343, 351

UNITED STATES PATENT OFFICE
CERTIFICATE OF CORRECTION

Patent No. 3,706,733   Dated December 19, 1972

Inventor(s) Clive A. Henrick and John B. Siddall

It is certified that error appears in the above-identified patent and that said Letters Patent are hereby corrected as shown below:

Page 1, lines 3, 4, and 5 change "Clive A. Henrick, 1621 Channing Ave., and John B. Siddall, 2470 Greer St., both of Palo Alto, Calif. 94304"

to read:

--Clive A. Henrick and John B. Siddall, both of Palo Alto, Calif., assignors to Zoecon Corp., Palo Alto, Calif., a corporation of Delaware.--

Signed and sealed this 15th day of October 1974.

(SEAL)
Attest:

McCOY M. GIBSON JR.　　　　　　　　　C. MARSHALL DANN
Attesting Officer　　　　　　　　　　Commissioner of Patents